(12) United States Patent
Ebihara et al.

(10) Patent No.: US 11,951,387 B2
(45) Date of Patent: Apr. 9, 2024

(54) CONTROLLER AND KEY STRUCTURE

(71) Applicant: NINTENDO CO., LTD., Kyoto (JP)

(72) Inventors: Kazuki Ebihara, Kyoto (JP); Hiroki Goto, Kyoto (JP); Noboru Wakitani, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 87 days.

(21) Appl. No.: 17/464,597

(22) Filed: Sep. 1, 2021

(65) Prior Publication Data
US 2022/0362661 A1  Nov. 17, 2022

(30) Foreign Application Priority Data
May 12, 2021 (JP) .................. 2021-080834

(51) Int. Cl.
| | |
|---|---|
| *H01H 25/04* | (2006.01) |
| *A63F 13/214* | (2014.01) |
| *A63F 13/24* | (2014.01) |
| *G06F 3/033* | (2013.01) |

(52) U.S. Cl.
CPC ............ *A63F 13/24* (2014.09); *A63F 13/214* (2014.09); *G06F 3/033* (2013.01); *H01H 25/041* (2013.01); *H01H 2221/012* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | |
|---|---|---|---|
| 4,687,200 A * | 8/1987 | Shirai | ................. H01H 13/785 200/6 A |
| 5,631,453 A | 5/1997 | Maeda | |
| 5,735,390 A | 4/1998 | Takagi et al. | |
| 5,833,050 A | 11/1998 | Takagi et al. | |
| 6,201,202 B1 | 3/2001 | Katagiri | |

(Continued)

FOREIGN PATENT DOCUMENTS

| | | |
|---|---|---|
| EP | 2 034 499 A1 | 3/2009 |
| JP | 7335082 A | 12/1995 |

(Continued)

*Primary Examiner* — Ahmed M Saeed
(74) *Attorney, Agent, or Firm* — Nixon & Vanderhye P.C.

(57) ABSTRACT

A controller includes a key top, a substrate, and an elastic member. The elastic member includes a pressed portion, a base, a skirt portion, and a pressing member. The substrate includes a contact. When viewed in the first direction, the pressing member is surrounded by an outer peripheral edge of a prescribed region. In the second direction, a distance between an end of the outer peripheral edge of the prescribed region on a side of a swing center of the key top and an end of a top surface on the side of the swing center is longer than a distance between an end of the outer peripheral edge of the prescribed region opposite to the swing center and an end of the top surface opposite to the swing center. In the second direction, the contact is located closer to the swing center than the top surface.

17 Claims, 18 Drawing Sheets

(56) References Cited

U.S. PATENT DOCUMENTS

| | | | |
|---|---|---|---|
| 7,060,920 B2 * | 6/2006 | Serizawa | H01H 23/003 200/1 B |
| 2006/0258464 A1 * | 11/2006 | Kawanobe | A63F 13/92 463/46 |
| 2009/0277765 A1 | 11/2009 | Inagaki | |

FOREIGN PATENT DOCUMENTS

| | | |
|---|---|---|
| JP | 8-31264 | 2/1996 |
| JP | 08-077885 | 3/1996 |
| JP | 2000-67698 A | 3/2000 |
| JP | 2000-82364 A | 3/2000 |
| WO | 2007/148446 A1 | 12/2007 |

* cited by examiner

CONTROLLER AND KEY STRUCTURE

This nonprovisional application is based on Japanese Patent Application No. 2021-080834 filed with the Japan Patent Office on May 12, 2021, the entire contents of which are hereby incorporated by reference.

FIELD

The present disclosure relates to a controller and a key structure.

BACKGROUND AND SUMMARY

A controller including a key switch has been known.

An exemplary embodiment provides a controller that includes a key top, a substrate, and an elastic member. The elastic member is provided between the key top and the substrate. The elastic member includes a pressed portion pressed as the key top swings, a base in contact with the substrate, a skirt portion that connects the pressed portion and the base to each other and is elastically deformed as the pressed portion is pressed, and a pressing member provided in a prescribed region that is a part of the pressed portion, is opposed to the substrate, and is surrounded by the skirt portion, at least a top surface of the pressing member opposed to the substrate being conductive. The top surface is constructed to press a contact as the skirt portion is elastically deformed. The substrate includes the contact at a position pressed by the top surface. A direction in which the key top and the elastic member are layered is defined as a first direction. A direction perpendicular to the first direction is defined as a second direction. When viewed in the first direction, the pressing member is surrounded by an outer peripheral edge of the prescribed region. In the second direction, a distance between an end of the outer peripheral edge of the prescribed region on a side of a swing center of the key top and an end of the top surface on the side of the swing center is longer than a distance between an end of the outer peripheral edge of the prescribed region opposite to the swing center and an end of the top surface opposite to the swing center. In the second direction, the contact is located closer to the swing center than the top surface.

In operating the key top, the key top may rotate inward. When the key top rotates inward, the pressing member is also lowered while being rotated inward. Therefore, the pressing member is inclined with respect to the surface of the contact. Consequently, an area of contact between the pressing member and the contact becomes smaller. In this case, contact sensitivity between the pressing member and the contact may become lower.

According to the controller, in the second direction, the distance between the end of the outer peripheral edge (a first inner end) of the prescribed region on the side of the swing center of the key top and the end (a second inner end) of the top surface on the side of the swing center is longer than the distance between the end of the outer peripheral edge (a first outer end) of the prescribed region opposite to the swing center and the end (a second outer end) of the top surface opposite to the swing center. In other words, the pressing member is provided on an outer side in the prescribed region of the pressed portion. Therefore, a radius of rotation of the pressing member can be larger than when the pressing member is provided on an inner side in the prescribed region of the pressed portion. Consequently, the pressing member can more linearly be lowered. Therefore, the area of contact between the pressing member and the contact can be made larger. Therefore, lowering in contact sensitivity between the pressing member and the contact can be suppressed.

When a key pad is reduced in size, the distance from the swing center to the pressing member becomes shorter. In this case, the radius of rotation of the pressing member becomes smaller and hence the pressing member tends to be lowered while being rotated. Therefore, the area of contact between the pressing member and the contact tends to be small. The controller according to the present disclosure can more effectively secure a large area of contact between the pressing member and the contact when the key top is reduced in size.

In operating the key top, when the pressing member is shifted inward, a central position of the pressing member may be displaced from a central position of the contact. In this case, contact sensitivity between the pressing member and the contact may be lowered.

According to the controller, in the second direction, the contact is located closer to the swing center than the pressing member. Therefore, when the pressing member is shifted inward, the central position of the pressing member moves in a direction toward the central position of the contact. Therefore, displacement of the central position of the pressing member from the central position of the contact can be suppressed. Consequently, lowering in contact sensitivity between the pressing member and the contact can further be suppressed.

In the controller, the key top may include a rib that surrounds at least a part of an outer circumferential side surface of the pressed portion.

According to this construction, displacement of the key top in a direction of rotation from the elastic member can be suppressed. The elastic member is fixed with respect to the substrate. Therefore, displacement of the key top in the direction of rotation from the contact arranged on the substrate can be suppressed. Consequently, occurrence of an erroneous input due to displacement of the key top in the direction of rotation can be suppressed.

In the controller, the rib may include an outer rib portion and an inner rib portion provided closer to the swing center than the outer rib portion. In a direction in parallel to the first direction, the inner rib portion may be larger in height than the outer rib portion.

The outer rib portion is larger in radius of rotation than the inner rib portion. Therefore, when the outer rib portion is equal in height to the inner rib portion, the outer rib portion is located below the inner rib portion at the time of pressing of the key top. Therefore, the outer rib portion may interfere with the skirt portion more than the inner rib portion. By setting the height of the inner rib portion to be larger than the height of the outer rib portion, interference of the outer rib portion with the skirt portion can be suppressed while the inner rib portion securely holds the pressed portion.

In the controller, in the direction in parallel to the first direction, the rib may increase in height from the outer rib portion toward the inner rib portion.

According to this construction, the rib can more securely be attached to the pressed portion while interference of the rib with the skirt portion is suppressed.

In the controller, each of the inner rib portion and the outer rib portion may be constructed such that, when the key top is pressed down, a distance between the substrate and the inner rib portion is equal to a distance between the substrate and the outer rib portion.

In the controller, a direction being in parallel to the second direction and extending radially from the swing center is defined as a radial direction. When viewed in the first direction, a clearance between the outer circumferential side surface and the rib in a third direction that passes through a center of the rib and is perpendicular to the radial direction may be smaller than a clearance between the outer circumferential side surface and the rib in the radial direction that passes through the center of the rib.

According to this construction, by reducing the clearance between the outer circumferential side surface and the rib in the third direction, displacement of the key top in the direction of rotation from the elastic member can further be suppressed. By increasing the clearance between the outer circumferential side surface and the rib in the radial direction, the rib can readily be attached to the pressed portion.

In the controller, the rib may include an inner circumferential surface and a protrusion that protrudes from the inner circumferential surface in the third direction.

In the controller, when viewed in the first direction, the key top may be in a cross shape.

Another exemplary embodiment provides a key structure that includes a key top and an elastic member. The elastic member is opposed to the key top. The elastic member includes a pressed portion pressed as the key top swings, a base distant from the pressed portion, a skirt portion that connects the pressed portion and the base to each other and is elastically deformed as the pressed portion is pressed, and a pressing member provided in a prescribed region that is a part of the pressed portion and is surrounded by the skirt portion, at least a top surface of the pressing member being conductive. A direction in which the key top and the elastic member are layered is defined as a first direction. A direction perpendicular to the first direction is defined as a second direction. When viewed in the first direction, the pressing member is surrounded by an outer peripheral edge of the prescribed region. In the second direction, a distance between an end of the outer peripheral edge of the prescribed region on a side of a swing center of the key top and an end of the top surface on the side of the swing center is longer than a distance between an end of the outer peripheral edge of the prescribed region opposite to the swing center and an end of the top surface opposite to the swing center.

According to the key structure, in the second direction, the distance between the end of the outer peripheral edge (a first inner end) of the prescribed region on the side of the swing center of the key top and the end (a second inner end) of the top surface on the side of the swing center is longer than the distance between the end of the outer peripheral edge (a first outer end) of the prescribed region opposite to the swing center and the end (a second outer end) of the top surface opposite to the swing center. In other words, the pressing member is provided on the outer side in the prescribed region of the pressed portion. Therefore, a radius of rotation of the pressing member can be larger than when the pressing member is provided on the inner side in the prescribed region of the pressed portion. Consequently, the pressing member can more linearly be lowered. Consequently, the area of contact between the pressing member and the contact can be made larger. Therefore, lowering in contact sensitivity between the pressing member and the contact can be suppressed.

In the key structure, the key top may include a rib that surrounds at least a part of an outer circumferential side surface of the pressed portion.

According to this construction, displacement of the key top in a direction of rotation from the elastic member can be suppressed. The elastic member is fixed with respect to the substrate. Therefore, displacement of the key top in the direction of rotation from the contact arranged on the substrate can be suppressed. Consequently, occurrence of an erroneous input due to displacement of the key top in the direction of rotation can be suppressed.

In the key structure, the rib may include an outer rib portion and an inner rib portion provided closer to the swing center than the outer rib portion. In a direction in parallel to the first direction, the inner rib portion may be larger in height than the outer rib portion.

The outer rib portion is larger in radius of rotation than the inner rib portion. Therefore, when the outer rib portion is equal in height to the inner rib portion, the outer rib portion is located below the inner rib portion at the time of pressing of the key top. Therefore, the outer rib portion may interfere with the skirt portion more than the inner rib portion. By setting the height of the inner rib portion to be larger than the height of the outer rib portion, interference of the outer rib portion with the skirt portion can be suppressed while the inner rib portion securely holds the pressed portion.

In the key structure, in the direction in parallel to the first direction, the rib may increase in height from the outer rib portion toward the inner rib portion.

According to this construction, the rib can more securely be attached to the pressed portion while interference of the rib with the skirt portion is suppressed.

In the key structure, a direction being in parallel to the second direction and extending radially from the swing center is defined as a radial direction. When viewed in the first direction, a clearance between the outer circumferential side surface and the rib in a third direction that passes through a center of the rib and is perpendicular to the radial direction may be smaller than a clearance between the outer circumferential side surface and the rib in the radial direction that passes through the center of the rib.

According to this construction, by reducing the clearance between the outer circumferential side surface and the rib in the third direction, displacement of the key top in the direction of rotation from the elastic member can further be suppressed. By increasing the clearance between the outer circumferential side surface and the rib in the radial direction, the rib can readily be attached to the pressed portion.

In the key structure, the rib may include an inner circumferential surface and a protrusion that protrudes from the inner circumferential surface in the third direction.

In the key structure, when viewed in the first direction, the key top may be in a cross shape.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
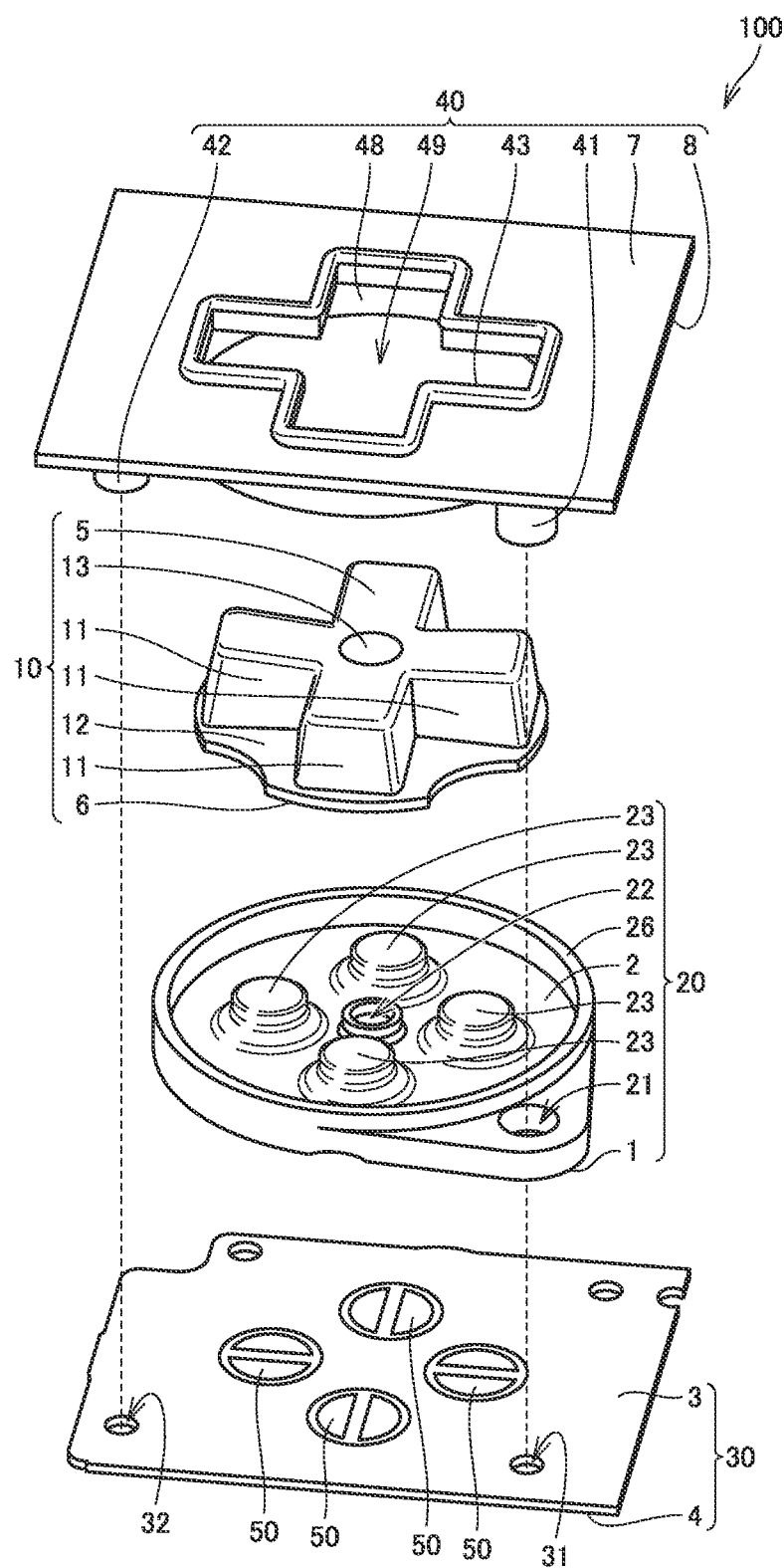
FIG. 1 shows an exemplary illustrative non-limiting exploded schematic perspective view illustrating a construction of a controller according to a first embodiment.

An embodiment of the present disclosure will be described in detail with reference to the drawings. The same or corresponding elements in the drawings have the same reference characters allotted and description thereof will not be repeated.

First Embodiment

[A. Overview of Controller]

Overview of a construction of a controller 100 according to a first embodiment of the present disclosure will initially be described.

FIG. 1 is an exploded schematic perspective view illustrating a construction of controller 100 according to the first embodiment. As shown in FIG. 1, controller 100 according to the first embodiment mainly includes a housing 40, a key top 10, an elastic member 20, and a substrate 30. Housing 40 includes a seventh surface 7, an eighth surface 8, a first inner wall surface 43, a first fixing portion 41, a second fixing portion 42, and a first annular member 48. Eighth surface 8 is located opposite to seventh surface 7. Housing 40 is provided with a first through hole 49. First through hole 49 is defined by first inner wall surface 43. First through hole 49 opens in each of seventh surface 7 and eighth surface 8. Eighth surface 8 is opposed to substrate 30. Eighth surface 8 is provided with first fixing portion 41, second fixing portion 42, and first annular member 48.

Key top 10 includes a fifth surface 5, a sixth surface 6, a key member 11, and a projecting portion 12. Sixth surface 6 is located opposite to fifth surface 5. A recess may be provided in a central portion 13 of fifth surface 5. Key member 11 may extend in four directions front central portion 13. For example, four key members 11 are provided. Key member 11 defines fifth surface 5. Projecting portion 12 is contiguous to key member 11. Projecting portion 12 may extend outward from key member 11. Projecting portion 12 defines sixth surface 6. Key top 10 is made, for example, of a resin.

Elastic member 20 includes a first surface 1, a second surface 2, a pressed portion 23, and a second annular member 26. First surface 1 is opposed to substrate 30. Second surface 2 is located opposite to first surface 1. Second surface 2 is opposed to key top 10. Pressed portion 23 is provided on second surface 2 as protruding. For example, four pressed portions 23 are provided. A central hole 22 is provided in elastic member 20. Central hole 22 opens in each of first surface 1 and second surface 2. Pressed portion 23 is arranged around central hole 22.

Pressed portion 23 is provided at a position opposed to key member 11. Second annular member 26 may be provided in an outer circumferential portion of second surface 2. Second annular member 26 surrounds pressed portions 23. Elastic member 20 is provided with a fixing hole 21. Fixing hole 21 opens in each of first surface 1 and second surface 2. Fixing hole 21 is provided on an outer side of second annular member 26. Central hole 22 is provided on an inner side of second annular member 26.

Substrate 30 includes a third surface 3 and a fourth surface 4. A contact 50 is provided on third surface 3. For example, four sets of contacts 50 are provided. Contact 50 is provided at a position opposed to pressed portion 23. For example, two conductive contact portions are included in one contact 50. Substrate 30 may be provided with a first hole 31 and a second hole 32. First fixing portion 41 is inserted in fixing hole 21 and positioned above first hole 31. Second fixing portion 42 is positioned above second hole 32.

[B. Key Top]

Figure 2:
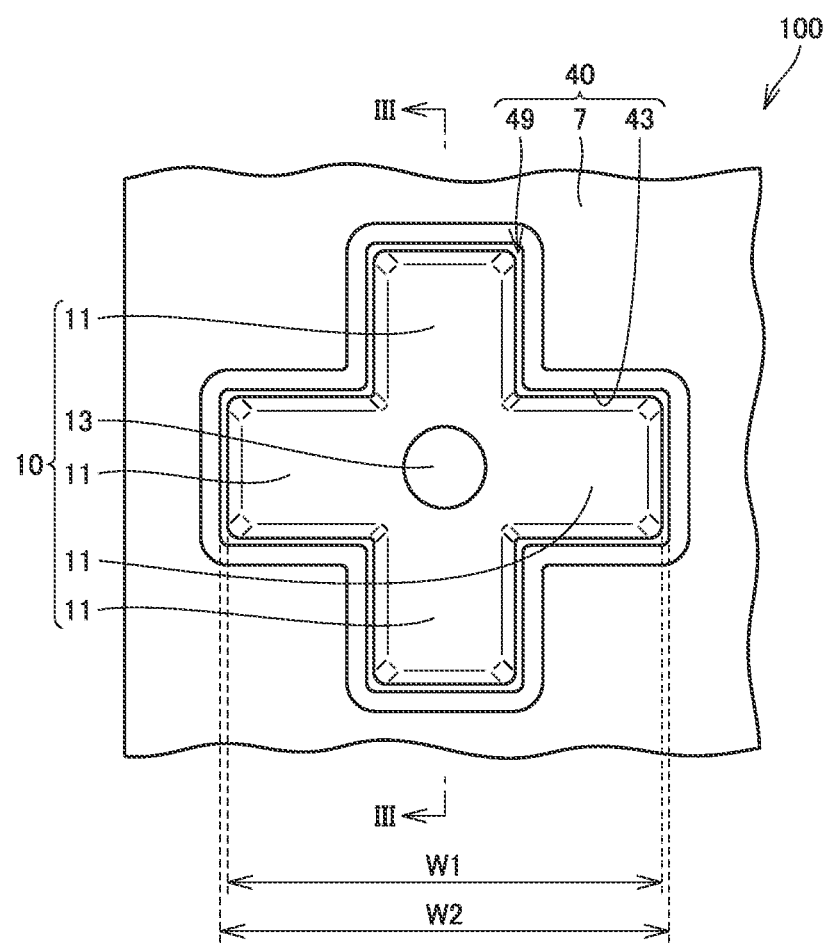
FIG. 2 shows an exemplary illustrative non-limiting schematic plan view illustrating the construction of the controller according to the first embodiment.

FIG. 2 is a schematic plan view illustrating the construction of controller 100 according to the first embodiment. The schematic plan view in FIG. 2 shows a state that housing 40, key top 10, elastic member 20, and substrate 30 shown in FIG. 1 are assembled. As shown in FIG. 2, in the plan view, key top 10 may be, for example, in a cross shape. Key top 10 is arranged in a region surrounded by first inner wall surface 43 of housing 40. A gap (in other words, a clearance) is provided between first inner wall surface 43 and key member 11 of key top 10. The clearance is set, for example, to 0.45 mm. The clearance may be not smaller than 0.3 mm and not larger than 0.6 mm.

As shown in FIG. 2, in the plan view, key top 10 has a width (a first width W1), for example, of 1 mm. An upper limit of first width W1 may be, for example, not larger than 20 mm or not larger than 18 mm, although it is not particularly limited. A lower limit of first width W1 may be, for example, not smaller than 10 mm or not smaller than 12 mm, although it is not particularly limited. As shown in FIG. 2, a width (a second width W2) of first through hole 49 is larger than first width W1. First width W1 may be a width of fifth surface 5 in the radial direction.

Figure 3:
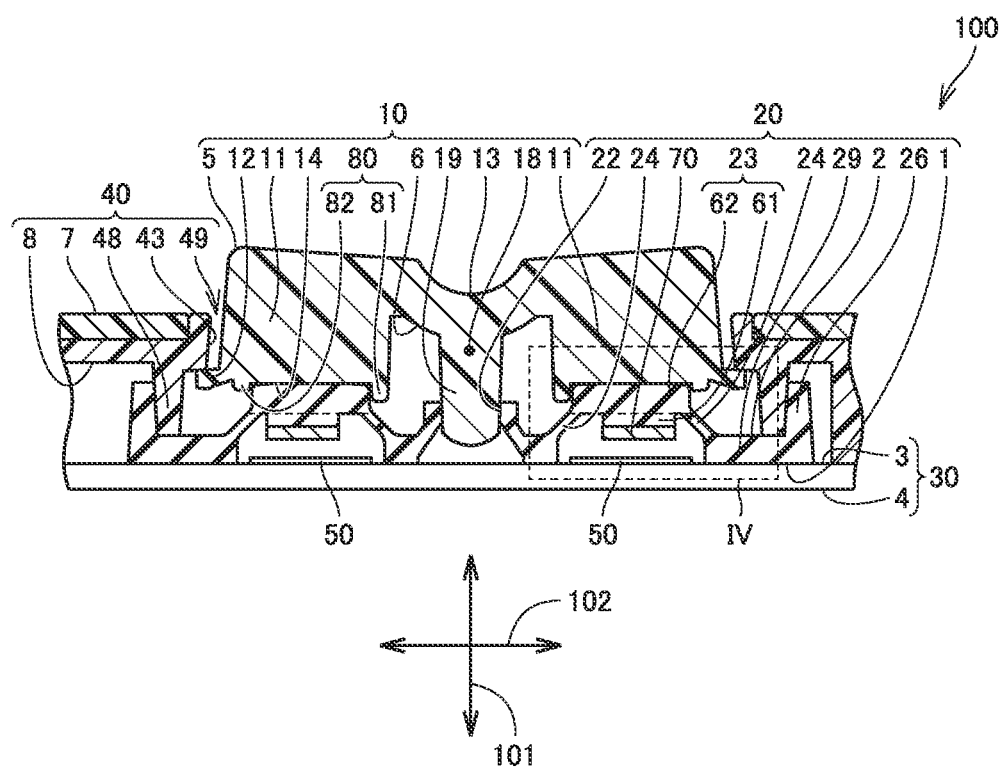
FIG. 3 shows an exemplary illustrative non-limiting schematic vertical cross-sectional view along the line in FIG. 2.

FIG. 3 is a schematic vertical cross-sectional view along the line III-III in FIG. 2. As shown in FIG. 3, a part of key top 10 is arranged in first through hole 49. Fifth surface 5 of key top 10 is located outside housing 40. Fifth surface 5 is, for example, a surface touched by a finger of a user. Sixth surface 6 is a surface opposed to elastic member 20. Sixth surface 6 may be in contact with elastic member 20. Sixth surface 6 may be located within housing 40. Projecting portion 12 of key top 10 may be in contact with eighth surface 8 of housing 40.

As shown in FIG. 3, key top 10 includes a central shaft 19. Key member 11 may be contiguous to central shaft 19. Key member 11 is provided around central shaft 19. Key member 11 is provided on each of opposing sides of central shaft 19. The number of key members 11 is not particularly limited. One key member, 11, two key members 11, four key members 11, or eight key members 11 may be provided. Fifth surface 5 in the cross shape of key top 10 is exposed as protruding through housing 40. A part of fifth surface 5 in the cross shape may be covered with housing 40.

[C. Elastic Member]

As shown in FIG. 3, elastic member 20 is provided between key top 10 and substrate 30. A direction from key top 10 toward elastic member 20 herein is defined as a downward direction. A direction from elastic member 20 toward key top 10 is defined as an upward direction. Elastic member 20 is in contact with key top 10. Elastic member 20 biases key top 10 upward. When a user applies downward force to key member 11, elastic member 20 is pressed down by key member 11. When the user is not applying downward force to key member 11 (that is, when the user is not touching key member 11), key member 11 is pushed upward by repulsive force of elastic member 20.

Central shaft 19 of key top 10 may be inserted in central hole 22 in elastic member 20. First annular member 48 is fitted to second annular member 26. An outer circumferential surface of first annular member 48 is in contact with an inner circumferential surface of second annular member 26. First annular member 48 may be in contact with second surface 2 of elastic member 20. When viewed from elastic member 20, substrate 30 is arranged opposite to key top 10. Third surface 3 of substrate 30 is opposed to first surface 1 of elastic member 20. A part of third surface 3 of substrate 30 is in contact with a part of first surface 1 of elastic member 20. Substrate 30 includes contact 50. Contact 50 is provided on third surface 3. Contact 50 may be provided at a position opposed to pressed portion 23. Contact 50 may be provided below key member 11.

As shown in FIG. 3, key member 11 of key top 10 is arranged on each of opposing sides of central shaft 19. When one of two key members 11 is pressed down, the other of two key members 11 is pushed up. In contrast, when the other of two key members 11 is pressed down, one of two key members 11 is pushed up. In other words, key top 10 can swing. A swing center 18 of key top 10 is located, for example, in central shaft 19.

A direction in parallel to a direction of layering of key top 10 and elastic member 20 is herein defined as a first direction 101. First direction 101 is the same as the direction of extension of central shaft 19. First direction 101 is also referred to as an axial direction. A direction perpendicular to first direction 101 is defined as a second direction 102. A direction being in parallel to second direction 102 and radially extending from swing center 18 is defined as a radial direction. A plan view is a view in a direction along first direction 101. A vertical cross-section is defined as a cross-section substantially in parallel to first direction 101. A lateral cross-section is defined as a cross-section substantially perpendicular to first direction 101.

Figure 4:
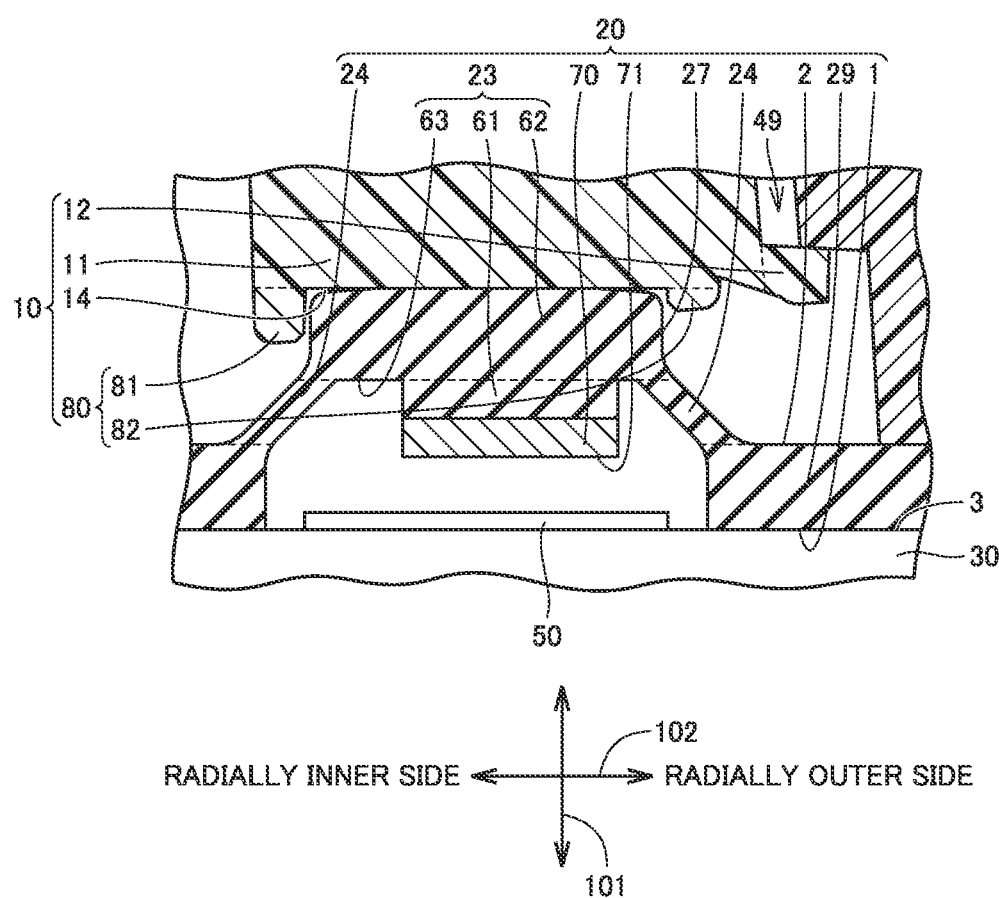
FIG. 4 shows an exemplary illustrative non-limiting enlarged schematic vertical cross-sectional view of a region IV in FIG. 3.

FIG. 4 is an enlarged schematic vertical cross-sectional view of a region IV in FIG. 3. As shown in FIG. 4, elastic member 20 includes pressed portion 23, a base 29, a skirt portion 24, and a pressing member 70. Pressed portion 23 is pressed as key top 10 swings. Pressed portion 23 may include a first member 61 and a second member 62. First member 61 is contiguous to second member 62. First member 61 is provided below second member 62. First member 61 is provided between second member 62 and pressing member 70. First member 61 is provided on a side of first surface 1. First member 61 forms a part of first surface 1. Second member 62 is provided on a side of second surface 2. In the radial direction, first member 61 may be smaller in width than second member 62. First member 61 may be surrounded by skirt portion 24.

Base 29 is in contact with substrate 30. Base 29 is in contact with third surface 3 of substrate 30. Base 29 forms a part of each of first surface 1 and second surface 2. Skirt portion 24 connects pressed portion 23 and base 29 to each other. Skirt portion 24 is contiguous to second member 62 of pressed portion 23. Skirt portion 24 is contiguous to base 29. Skirt portion 24 is elastically deformed as pressed portion 23 is pressed. Skirt portion 24 is tapered from base 29. From a different point of view, skirt portion 24 is tapered upward.

Upward biasing force may be applied to key top 10 by skirt portion 24. Pressed portion 23 is in contact with key top 10. Skirt portion 24 may be distant from key top 10. Pressed portion 23 includes a prescribed region 63 opposed to substrate 30. Prescribed region 63 is surrounded by skirt portion 24. Pressing member 70 is provided in prescribed region 63 of pressed portion 23. Pressing member 70 may be provided within prescribed region 63, for example, in first member 61 of pressed portion 23 that protrudes toward substrate 30.

Pressed portion 23 does not have to include first member 61. In this case, pressing member 70 is provided in second member 62. Pressing member 70 includes a top surface 71 opposed to substrate 30. Contact 50 is arranged at a position pressed by top surface 71 of pressing member 70. Top surface 71 is constructed to push contact 50 as skirt portion 24 is elastically deformed. Top surface 71 may be opposed to contact 50. Pressing member 70 can be in contact with contact 50.

Each of pressed portion 23, base 29, and skirt portion 24 is made, for example, of silicone. Each of pressed portion 23, base 29, and skirt portion 24 is insulating. Pressing member 70 is made, for example, of carbon. Though entire pressing member 70 does not have to be conductive, at least top surface 71 of pressing member 70 is conductive. Pressing member 70 may be formed integrally with pressed portion 23 or may be fixed to pressed portion 23 by an adhesive or the like.

[D. Rib]

As shown in FIG. 4, key top 10 includes a rib 80. Rib 80 is provided below key top 10. Rib 80 protrudes downward from a bottom surface 14 of key member 11. Bottom surface 14 is a surface in contact with pressed portion 23. Rib 80 surrounds at least a part of an outer circumferential side surface 27 of pressed portion 23. Rib 80 may surround the entire circumference of pressed portion 23. Rib 80 surrounds outer circumferential side surface 27 of second member 62. Rib 80 may be provided not to surround skirt portion 24. Rib 80 may be distant from skirt portion 24.

As shown in FIG. 4, rib 80 may include an outer rib portion 82 and an inner rib portion 81. Inner rib portion 81 is provided on a radially inner side relative to outer rib portion 82. As shown in FIGS. 3 and 4, inner rib portion 81 is located between central shaft 19 and outer rib portion 82. In a direction in parallel to first direction 101, inner rib portion 81 may be larger in height than outer rib portion 82.

Figure 5:
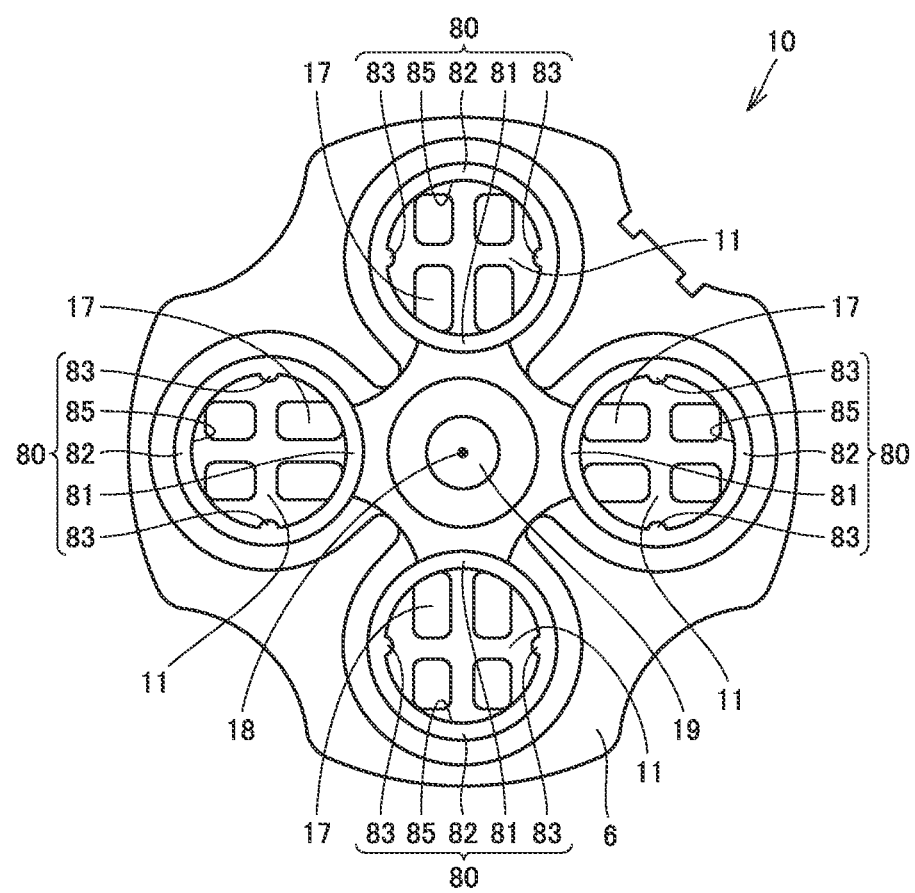
FIG. 5 shows an exemplary illustrative non-limiting schematic bottom view illustrating a construction of a key top when viewed from a side of a sixth surface.

FIG. 5 is a schematic bottom view illustrating a construction of key top 10 when viewed from a side of sixth surface 6. As shown in FIG. 5, when viewed in first direction 101, key members 11 are arranged at regular intervals around central shaft 19. When viewed in first direction 101, around swing center 18 that coincides with central shaft 19, a plurality of key members 11 are arranged, for example, at positions at 0°, 90°, 180°, and 270°.

A recess 17 which is a space recessed upward may be provided in bottom surface 14 of key member 11. Rib 80 may include an inner circumferential surface 85 and a protrusion 83. Protrusion 83 protrudes from inner circumferential surface 85 in a third direction 103. Third direction 103 is a direction that passes through a center of rib 80 and is perpendicular to the radial direction when viewed in first direction 101 (see FIG. 7). One protrusion 83 or two protrusions 83 may be provided. When two protrusions 83 are provided, two protrusions 83 may be opposed to each other.

Figure 6:
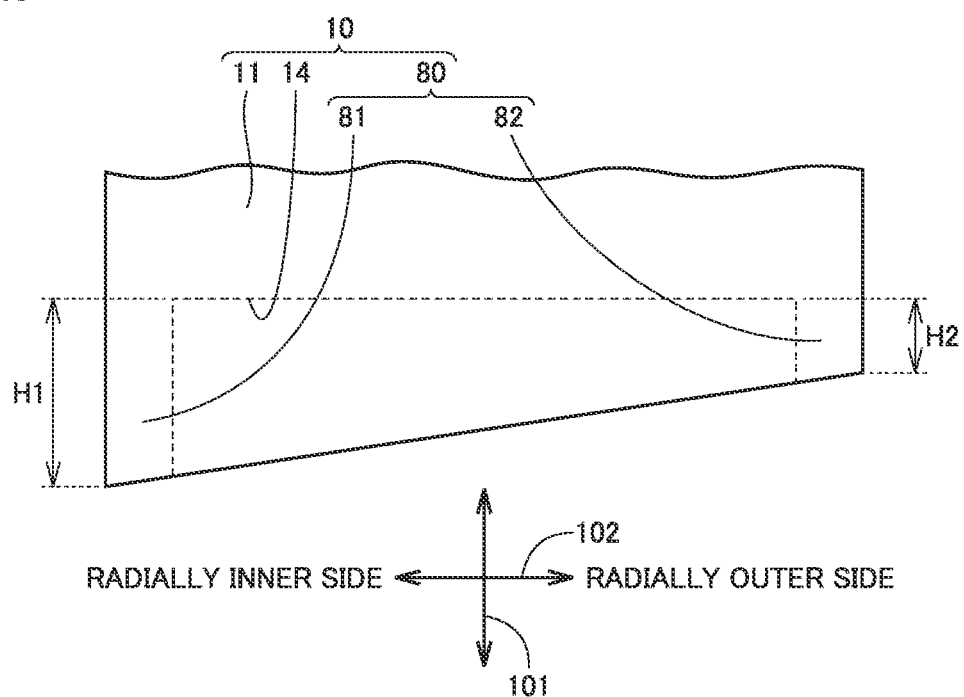
FIG. 6 shows an exemplary illustrative non-limiting schematic side view illustrating a construction of a rib.

FIG. 6 is a schematic side view illustrating a construction of rib 80. The side surface shown in FIG. 6 is a side surface of rib 80 viewed in the direction perpendicular to second direction 102 (radial direction). As shown in FIG. 6, the height of rib 80 in the direction in parallel to first direction 101 increases toward inner rib portion 81 from outer rib portion 82. The height of rib 80 in the direction in parallel to first direction 101 may monotonously increase toward inner rib portion 81 from outer rib portion 82. In second direction 102 (radial direction), inner rib portion 81 is located on an innermost side (the side of swing center 18). In second direction 102 (radial direction), outer rib portion 82 is located on an outermost side.

As shown in FIG. 6, in first direction 101, the height (a first height H1) of inner rib portion 81 is larger than the height (a second height H2) of outer rib portion 82. A lower limit of first height H1 may be, for example, at least 1.2 time or at least 1.5 time as large as second height H2, although it is not particularly limited. An upper limit of first height H1 may be, for example, at most five times or at most four times as large as second height H2, although it is not particularly limited.

Figure 7:
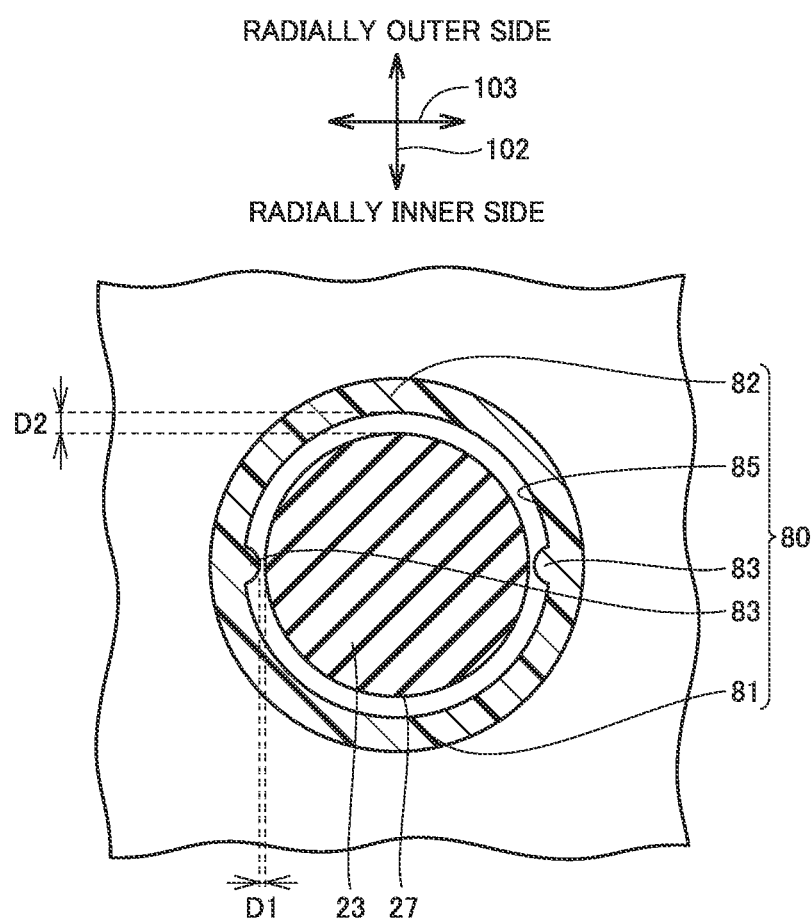
FIG. 7 shows an exemplary illustrative non-limiting schematic lateral cross-sectional view illustrating a clearance between the rib and a pressed portion.

FIG. 7 is a schematic lateral cross-sectional view illustrating a clearance between the rib and pressed portion 23. FIG. 7 corresponds to a structure around key member 11 located on an upper side in FIG. 5. As shown in FIG. 7, when viewed in first direction 101, a clearance between pressed portion 23 and rib 80 in third direction 103 may be smaller than a clearance between pressed portion 23 and rib 80 in the radial direction. As shown in FIG. 7, when viewed in first direction 101, a distance (a first distance D1) between outer circumferential side surface 27 of pressed portion 23 and inner circumferential surface 85 of rib 80 in third direction 103 may be shorter than a distance (a second distance D2) between outer circumferential side surface 27 of pressed portion 23 and inner circumferential surface 85 of rib 80 in the radial direction. First distance D1 is set, for example, to 0.01 mm. Second distance D2 is set, for example, to 0.05 mm. First distance D1 may be set to 0 mm. In other words, when viewed in first direction 101, no clearance between pressed portion 23 and rib 80 in third direction 103 may be provided. In this case as well, when viewed in first direction 101, the clearance between pressed portion 23 and rib 80 in third direction 103 can be concluded as being smaller than the clearance between pressed portion 23 and rib 80 in the radial direction.

[E. Arrangement of Pressing Member]

Figure 8:
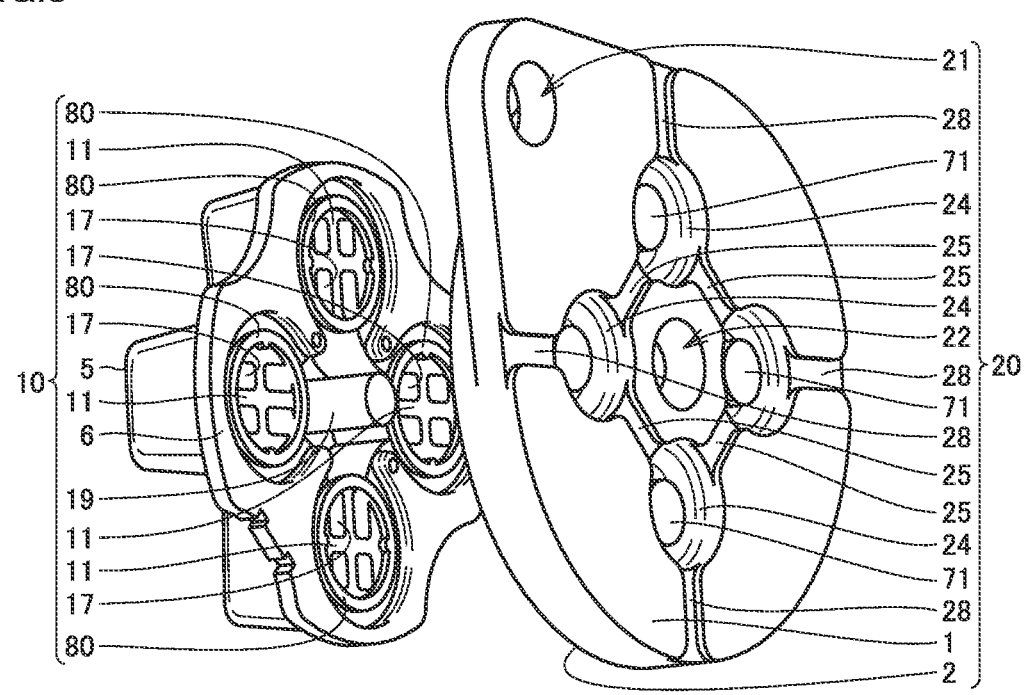
FIG. 8 shows an exemplary illustrative non-limiting schematic perspective view illustrating a construction of the key top and an elastic member.

FIG. 8 is a schematic perspective view illustrating a construction of key top 10 and elastic member 20. As shown in FIG. 8, second surface 2 of elastic member 20 is opposed to sixth surface 6 of key top 10. Central shaft 19 of key top 10 is positioned at central hole 22 in elastic member 20. In the direction in parallel to the direction along central shaft 19, the plurality of key members 11 are arranged as being superimposed on top surfaces 71 of a plurality of pressing members 70, respectively.

Figure 9:
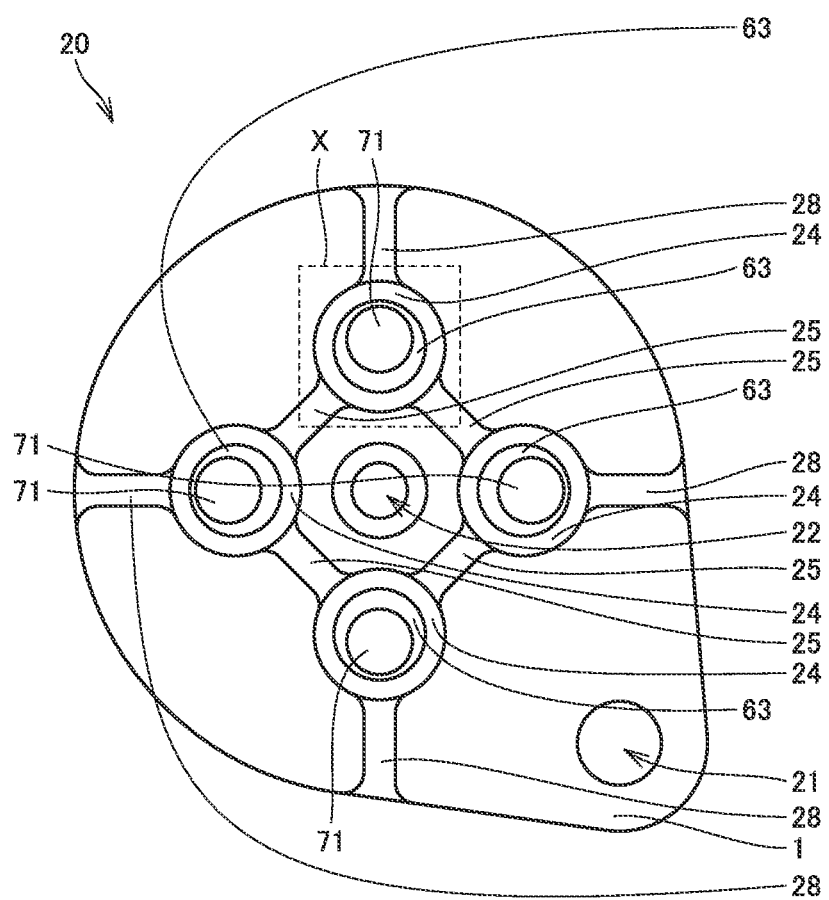
FIG. 9 shows an exemplary illustrative non-limiting schematic plan view illustrating a construction of the elastic member.

FIG. 9 is a schematic plan view illustrating a construction of elastic member 20. As shown in FIG. 9, when viewed in first direction 101, prescribed regions 63 of a plurality of pressed portions 23 are arranged at regular intervals around central hole 22. Around central hole 22, prescribed regions 63 of the plurality of pressed portions 23 are arranged, for example, at positions at 0°, 90°, 180°, and 270°. Similarly, when viewed in first direction 101, top surfaces 71 of the plurality of pressing members 70 are arranged at regular intervals around central hole 22. Around central hole 22, top surfaces 71 of the plurality of pressing members 70 are arranged, for example, at positions at 0°, 90°, 180°, and 270°. The plurality of pressing members 70 are provided in prescribed regions 63 of the plurality of pressed portions 23, respectively.

As shown in FIG. 9, when viewed in first direction 101, a plurality of skirt portions 24 are arranged at regular intervals around central hole 22. Around central hole 22, the plurality of skirt portions 24 are arranged, for example, at positions at 0°, 90°, 180°, and 270°. In first surface 1 of elastic member 20, a first connection groove 25 and a second connection groove 28 are provided. First connection groove 25 connects spaces in two adjacent key members 11 surrounded by elastic member 20 and substrate 30 to each other. Second connection groove 28 connects the space surrounded by elastic member 20 and substrate 30 in key member 11 to an external space.

Figure 10:
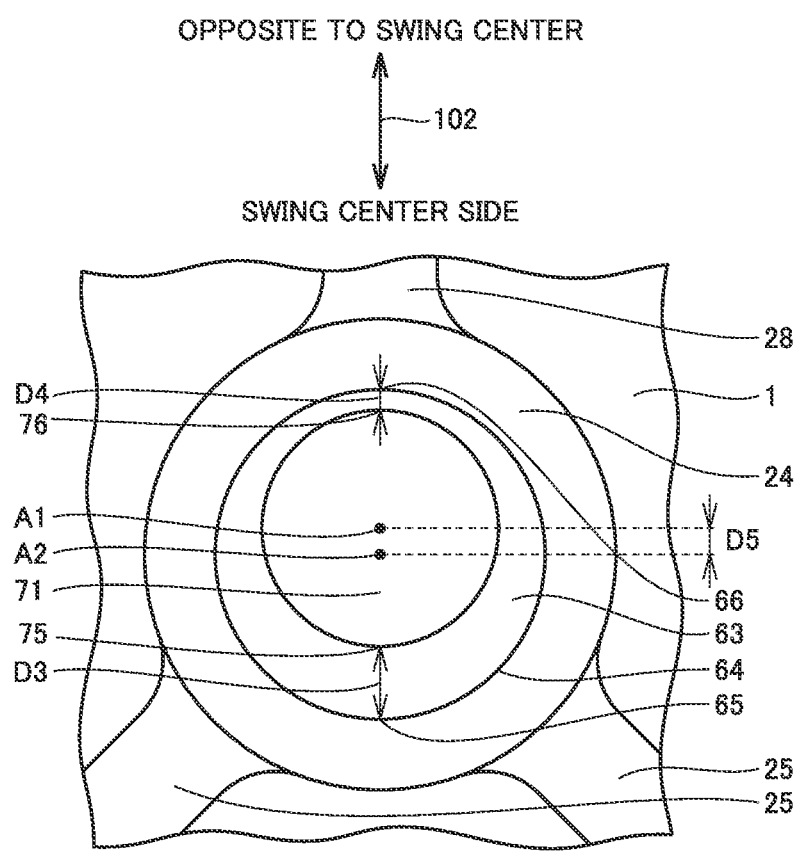
FIG. 10 shows an exemplary illustrative non-limiting enlarged schematic plan view of a region X in FIG. 9.

FIG. 10 is an enlarged schematic plan view of a region X in FIG. 9. As shown in FIGS. 9 and 10, when viewed in first direction 101, top surface 71 of pressing member 70 is surrounded by an outer peripheral edge 64 of prescribed region 63. When viewed in first direction 101, prescribed region 63 is surrounded by skirt portion 24. Outer peripheral edge 64 of prescribed region 63 is a boundary between skirt portion 24 and prescribed region 63. When viewed in first direction 101, prescribed region 63 is, for example, in a circular shape. When viewed in first direction 101, top surface 71 of pressing member 70 is, for example, in a circular shape. In the radial direction, a position of a center (a first center A1) of top surface 71 of pressing member 70 is different from a position of a center (a second center A2) of prescribed region 63. First center A1 is located on a radially outer side relative to second center A2. From a different point of view, in the radial direction, top surface 71 of pressing member 70 is eccentric with respect to prescribed region 63.

In second direction 102, a lower limit of a distance (a fifth distance D5) between first center A1 and second center A2 may be, for example, not shorter than 0.1 mm or not shorter than 0.2 mm, although it is not particularly limited. An upper limit of the distance (fifth distance D5) between first center A1 and second center A2 may be, for example, not longer than 1 mm or not longer than 0.5 mm, although it is not particularly limited.

Though prescribed region 63 is, for example, in a circular shape, the shape thereof is not limited to the circular shape. Prescribed region 63 may be, for example, in an oval or polygonal shape. Similarly, though top surface 71 is, for example, in a circular shape, the shape thereof is not limited to the circular shape. As shown in FIG. 10, in second direction 102, a distance (a third distance D3) between an end of the outer peripheral edge (a first inner end 65) of prescribed region 63 on the side of swing center 18 and an end (a second inner end 75) of top surface 71 on the side of swing center 18 is longer than a distance (a fourth distance D4) between an end of the outer peripheral edge (a first outer end 66) of prescribed region 63 opposite to swing center 18 and an end (a second outer end 76) of top surface 71 opposite to swing center 18. A lower limit of fourth distance D4 may be, for example, not shorter than 0.05 mm or not shorter than 0.1 mm, although it is not particularly limited. An upper limit of fourth distance D4 may be, for example, not longer than 1 mm or not longer than 0.5 mm, although it is not particularly limited. A ratio between fourth distance D4 and third distance D3 may be accommodated within a range of ratios from 1:2 to 1:4.

[F. Contact]

Figure 11:
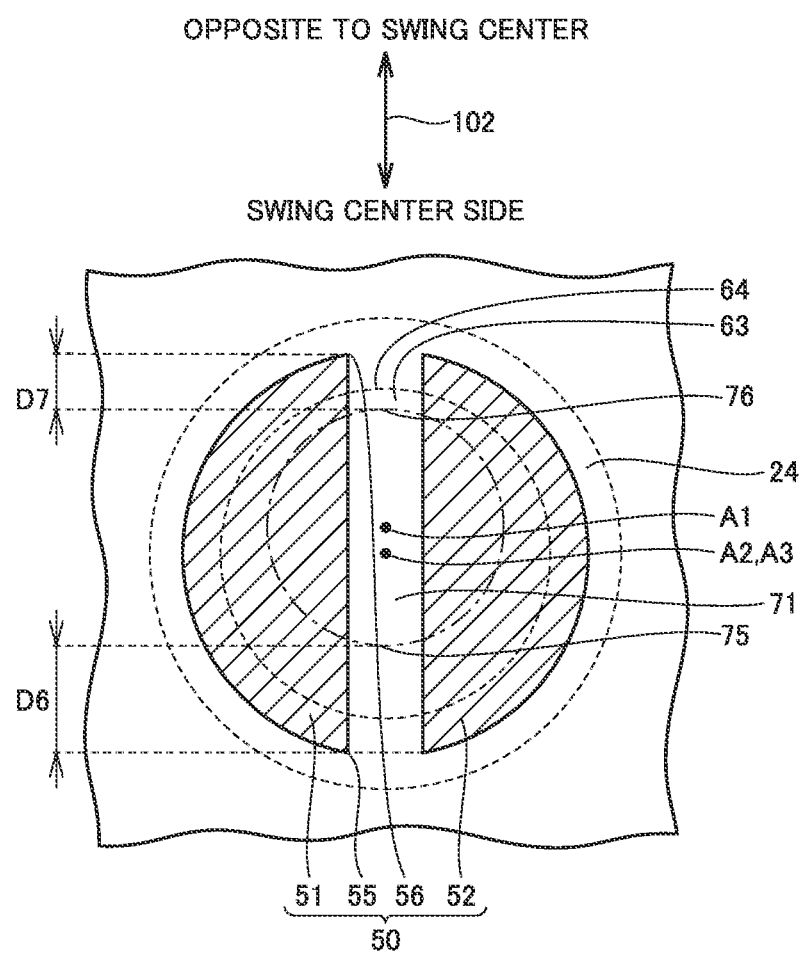
FIG. 11 shows an exemplary illustrative non-limiting schematic plan view illustrating positional relation between a contact and a top surface of a pressing member.

FIG. 11 is a schematic plan view illustrating positional relation between contact 50 and top surface 71 of pressing member 70. As shown in FIG. 11, contact 50 includes, for example, a first contact portion 51 and a second contact portion 52. Contact 50 is conductive. Contact 50 is made, for example, of carbon. When viewed in first direction 101, each of first contact portion 51 and second contact portion 52 is, for example, in a semicircular shape. First contact portion 51 is distant from second contact portion 52. First contact portion 51 and second contact portion 52 may be in line symmetry to each other. A center of a virtual circle including an arc portion of first contact portion 51 and an arc portion of second contact portion 52 is defined as a third center A1 When viewed in first direction 101, third center A3 may coincide with second center A2.

As shown in FIG. 11, in second direction 102, contact 50 is located closer to swing center 18 than top surface 71. Specifically, in second direction 102, third center A3 is located on a radially inner side relative to first center A1. From a different point of view, in second direction 102, a distance (a sixth distance D6) between an end (a third inner end 55) of contact 50 on the side of swing center 18 and an end (a second inner end 75) of top surface 71 on the side of swing center 18 may be longer than a distance (a seventh distance D7) between an end (a third outer end 56) of contact 50 opposite to swing center 18 and an end (a second outer end 76) of top surface 71 opposite to swing center 18.

[G. Operation]

Figure 12:
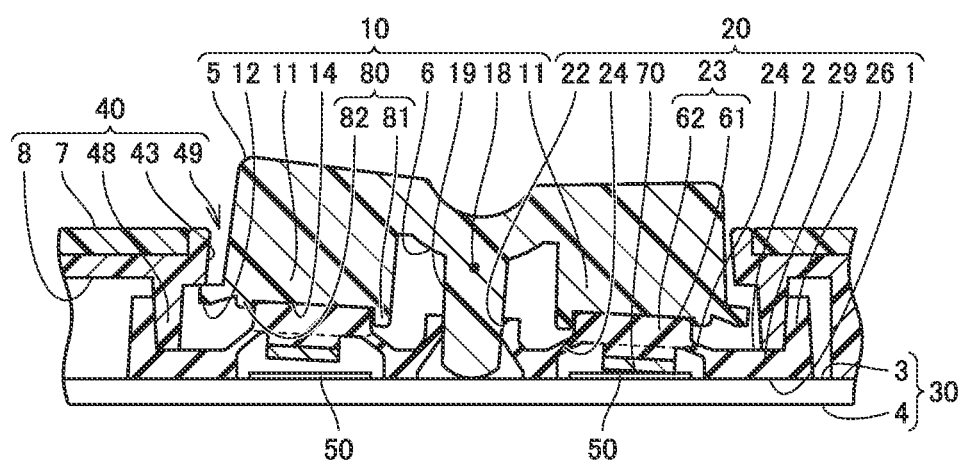
FIG. 12 shows an exemplary illustrative non-limiting schematic vertical cross-sectional view illustrating a state of contact of the pressing member with the contact.

FIG. 12 is a schematic vertical cross-sectional view illustrating a state of contact of pressing member 70 with contact 50. When a user presses down key member 11 of key top 10 located on the right, pressing member 70 is moved downward. Pressing member 70 comes in contact with contact 50. When pressing member 70 comes in contact with both of first contact portion 51 and second contact portion 52, a current flows between first contact portion 51 and second contact portion 52 through pressing member 70. Controller 100 thus senses the fact that the user has provided an input onto contact 50. When pressing member 70 comes in contact with contact 50, central shaft 19 may come in contact with third surface 3 of substrate 30.

As a finger of the user moves away from key member 11 of key top 10, key member 11 moves upward owing to resilience of skirt portion 24. Pressing member 70 thus moves away from contact 50. As pressing member 70 moves away from contact 50, no current flows between first contact portion 51 and second contact portion 52. Controller 100 thus senses the fact that the user stopped providing an input onto contact 50. While pressing member 70 is distant from contact 50, central shaft 19 may be distant from third surface 3 of substrate 30.

Key top 10 swings around swing center 18. As shown in FIG. 12, as right key member 11 moves downward, left key member 11 moves upward. In contrast, as left key member 11 moves downward, right key member 11 moves upward.

Figure 13:
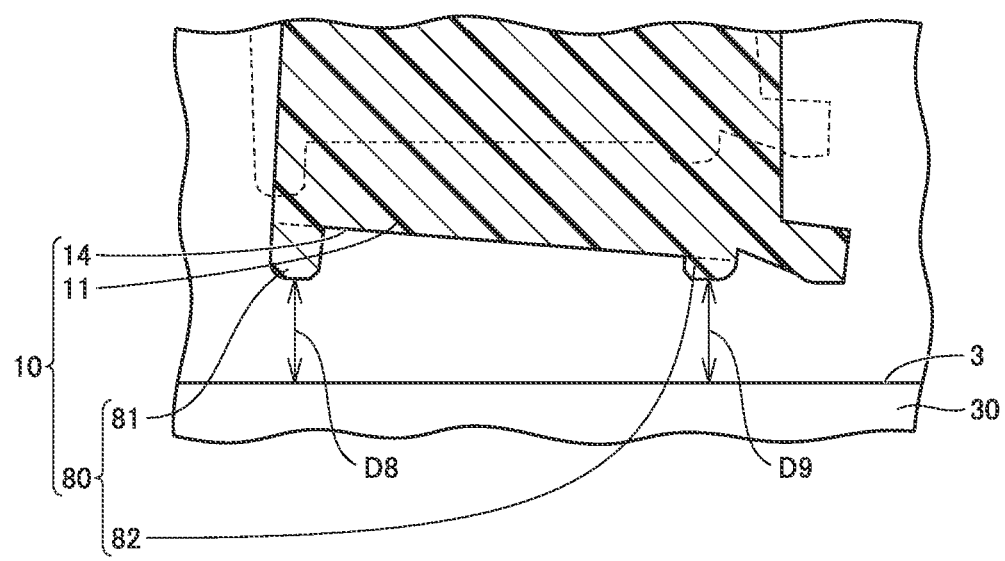
FIG. 13 shows an exemplary illustrative non-limiting schematic vertical cross-sectional view illustrating an exemplary position of the rib when the key top is pressed down.

FIG. 13 is a schematic vertical cross-sectional view illustrating an exemplar position of rib 80 when key top 10 is pressed down. A position of rib 80 when key top 10 is pressed down is shown with a solid line. A position of rib 80 when key top 10 is not pressed down is shown with a dashed line. As shown in FIG. 13, each of inner rib portion 81 and outer rib portion 82 may be constructed such that the distance between substrate 30 and inner rib portion 81 is equal to the distance between substrate 30 and outer rib portion 82 when key top 10 is pressed down. Specifically, when key top 10 is pressed down, a distance (an eighth distance D8) between third surface 3 of substrate 30 and inner rib portion 81 may be equal to a distance (a ninth distance D9) between third surface 3 of substrate 30 and outer rib portion 82.

Though controller 100 according to the first embodiment is, for example, a game controller for performing an operation in a game, the controller is not limited to the game controller. Controller 100 according to the first embodiment may be a controller for performing an operation for information processing other than the game. Controller 100 according to the first embodiment may be, for example, a controller for information processing for performing an operation for moving a cursor or selecting a menu.

[H. Advantages]

According to controller 100 in the first embodiment, in second direction 102, the distance between the end of the outer peripheral edge (first inner end 65) of prescribed region 63 on the side of swing center 18 of key top 10 and the end (second inner end 75) of top surface 71 on the side of swing center 18 is longer than the distance between the end of the outer peripheral edge (first outer end 66) of prescribed region 63 opposite to swing center 18 and the end (second outer end 76) of top surface 71 opposite to swing center 18. In other words, pressing member 70 is provided on the outer side in prescribed region 63 of pressed portion 23. Therefore, a radius of rotation of pressing member 70 can be larger than when pressing member 70 is provided on the inner side in prescribed region 63 of pressed portion 23. Consequently, pressing member 70 can more linearly be lowered. Therefore, the area of contact between pressing member 70 and contact 50 can be made larger. Therefore, lowering in contact sensitivity between pressing member 70 and contact 50 can be suppressed.

When a key pad is reduced in size, the distance from swing center 18 to pressing member 70 becomes shorter. In this case, the radius of rotation of pressing member 70 becomes smaller and hence pressing member 70 tends to be lowered while being rotated. Therefore, the area of contact between pressing member 70 and contact 50 tends to be small. Controller 100 according to the present disclosure can more effectively secure a large area of contact between pressing member 70 and contact 50 when key top 10 is reduced in size.

In operating key top 10, when pressing member 70 is shifted inward, a central position of pressing member 70 may be displaced from a central position of contact 50. In this case, contact sensitivity between pressing member 70 and contact 50 may be lowered.

According to controller 100 in the first embodiment, in second direction 102, contact 50 is located closer to swing center 18 than pressing member 70. Therefore, when pressing member 70 is shifted inward, the central position of pressing member 70 moves in a direction toward the central position of contact 50. Therefore, displacement of the central position of pressing member 70 from the central position of contact 50 can be suppressed. Consequently, lowering in contact sensitivity between pressing member 70 and contact 50 can further be suppressed.

In order to address the problem of inward rotation of pressing member 70, a construction in which contact 50 is located on the radially inner side is also possible. By locating pressing member 70 on the radially outer site, however, pressing member 70 can more linearly be lowered. By increasing a diameter of pressing member 70 without changing the central position of pressing member 70 as well, pressing member 70 can extend radially outward. Increase in diameter of pressing member 70, however, may lead to tendency of an erroneous input as will be described later. Therefore, occurrence of an erroneous input can be suppressed by setting a diameter of pressing member 70 to moderate magnitude.

Figure 18:
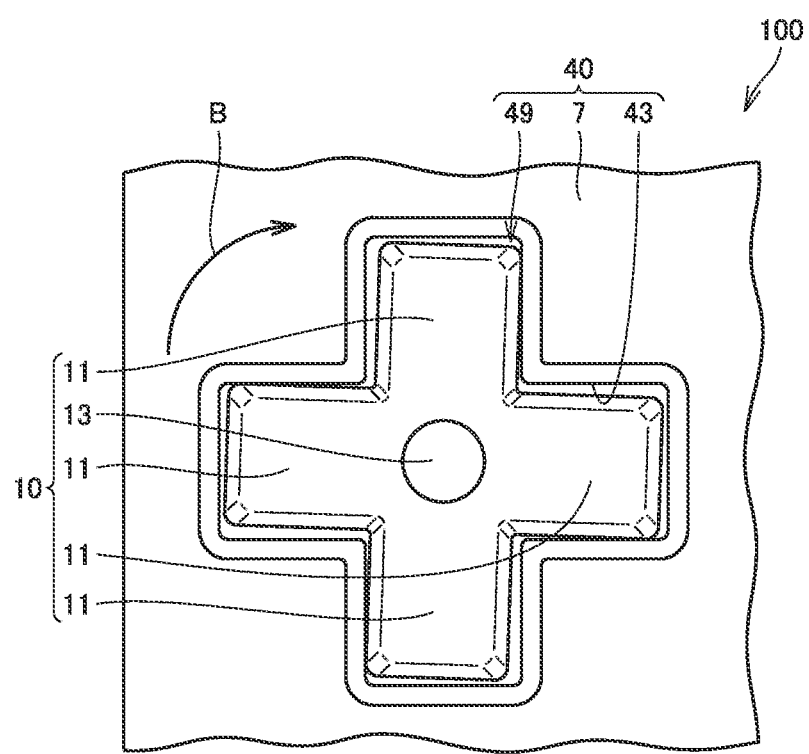
FIG. 18 shows an exemplary illustrative non-limiting schematic plan view illustrating a state of the controller when position displacement of the key top in a direction of rotation occurs.

FIG. 18 is a schematic plan view illustrating a state of the controller when position displacement of key top 10 in a direction of rotation occurs. As shown in FIG. 18, since there is a gap between first inner wall surface 43 and key top 10, key top 10 may move in a direction of rotation B. In this case, for example, pressing member 70 located at 0° may be in contact with both of contact 50 located at 0° and contact 50 located at 90°. Thus, when key top 10 is pressed, an unintended oblique input may be provided. Pressing member 70 is formed in elastic member 20. Therefore, when elastic member 20 is deformed, pressing member 70 may be inclined. An erroneous input may be provided also in this case.

In controller 100 according to the first embodiment, key top 10 may include rib 80 that surrounds at least a part of the outer circumferential side surface of pressed portion 23.

According to this construction, displacement of key top 10 in a direction of rotation from elastic member 20 can be suppressed. Elastic member 20 is fixed with respect to substrate 30. Therefore, displacement of key top 10 in the direction of rotation from contact 50 arranged on substrate 30 can be suppressed. Consequently, occurrence of an erroneous input due to displacement of key top 10 in the direction of rotation can be suppressed.

In controller 100 according to the first embodiment, rib 80 may include outer rib portion 82 and inner rib portion 81 provided closer to swing center 18 than outer rib portion 82. In the direction in parallel to first direction 101, inner rib portion 81 may be larger in height than outer rib portion 82.

Outer rib portion 82 is larger in radius of rotation than inner rib portion 81. Therefore, when outer rib portion 82 is equal in height to inner rib portion 81, outer rib portion 82 is located below inner rib portion 81 at the time of pressing of key top 10. Therefore, outer rib portion 82 may interfere with skirt portion 24 more than inner rib portion 81. By setting inner rib portion 81 to be higher than outer rib portion 82, interference of outer rib portion 82 with skirt portion 24 can be suppressed while inner rib portion 81 securely holds pressed portion 23.

In controller 100 according to the first embodiment, in the direction in parallel to first direction 101, rib 80 may increase in height from outer rib portion 82 toward inner rib portion 81.

According to this construction, rib 80 can more securely be attached to pressed portion 23 while interference of rib 80 with skirt portion 24 is suppressed.

In controller 100 according to the first embodiment, a direction being in parallel to second direction 102 and extending radially from swing center 18 is defined as the radial direction. When viewed in first direction 101, a clearance between the outer circumferential side surface and rib 80 in third direction 103 that passes through the center of rib 80 and is perpendicular to the radial direction may be smaller than a clearance between the outer circumferential side surface and rib 80 in the radial direction that passes through the center of rib 80.

According to this construction, by reducing the clearance between the outer circumferential side surface and rib 80 in third direction 103, displacement of key top 10 in the direction of rotation from elastic member 20 can further be suppressed. By increasing the clearance between the outer circumferential side surface and rib 80 in the radial direction, rib 80 can readily be attached to pressed portion 23.

Second Embodiment

A construction of controller 100 according to a second embodiment of the present disclosure will now be described. Controller 100 according to the second embodiment is different from controller 100 according to the first embodiment mainly in that a shape of the upper surface of key top 10 is substantially rectangular, and it is otherwise similar to controller 100 according to the first embodiment. Description will be given below with a difference from controller 100 according to the first embodiment being focused on.

Figure 14:
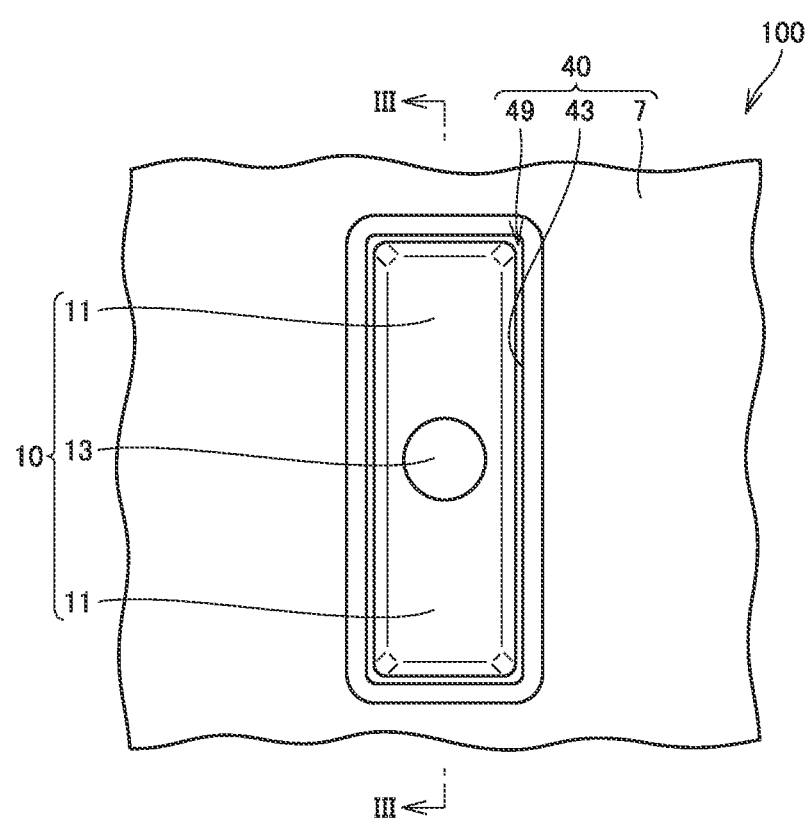
FIG. 14 shows an exemplary illustrative non-limiting schematic plan view illustrating a construction of the controller according to a second embodiment.

FIG. 14 is a schematic plan view illustrating a construction of controller 100 according to the second embodiment. As shown in FIG. 14, when viewed in first direction 101, the upper surface (fifth surface 5) of key top 10 may be in a substantially rectangular shape. Key top 10 may include, for example, two key members 11. When two key members 11 are provided, two pressing members 70 may be provided. When two key members 11 are provided, two sets of contacts 50 may be provided.

The schematic vertical cross-sectional view along the line in FIG. 14 is shown in FIG. 3. The schematic vertical cross-sectional view of controller 100 according to the second embodiment is substantially the same as the schematic cross-sectional view of controller 100 according to the first embodiment. The number of key members 11 is not limited to two. For example, a single key member 11 may be provided. When a single key member H is provided, one end of key top 10 serves as a fulcrum and the other end of key top 10 serves as key member 11. Pivot of key member 11 around the fulcrum is herein also defined as swing. In this case, the fulcrum corresponds to swing center 18. A direction from the fulcrum toward key member 11 corresponds to the radial direction. When a single key member 11 is provided, a single pressing member 70 may be provided. When a single key member 11 is provided, one set of contacts 50 may be provided. Controller 100 according to the second embodiment is advantageous similarly to controller 100 according to the first embodiment.

Third Embodiment

A construction of controller 100 according to a third embodiment of the present disclosure will now be described.

Controller 100 according to the third embodiment is different from controller 100 according to the first embodiment mainly in that four contact portions are included in one set of contacts 50, and it is otherwise similar to controller 100 according to the first embodiment. Description will be given below with a difference from controller 100 according to the first embodiment being focused on.

Figure 15:
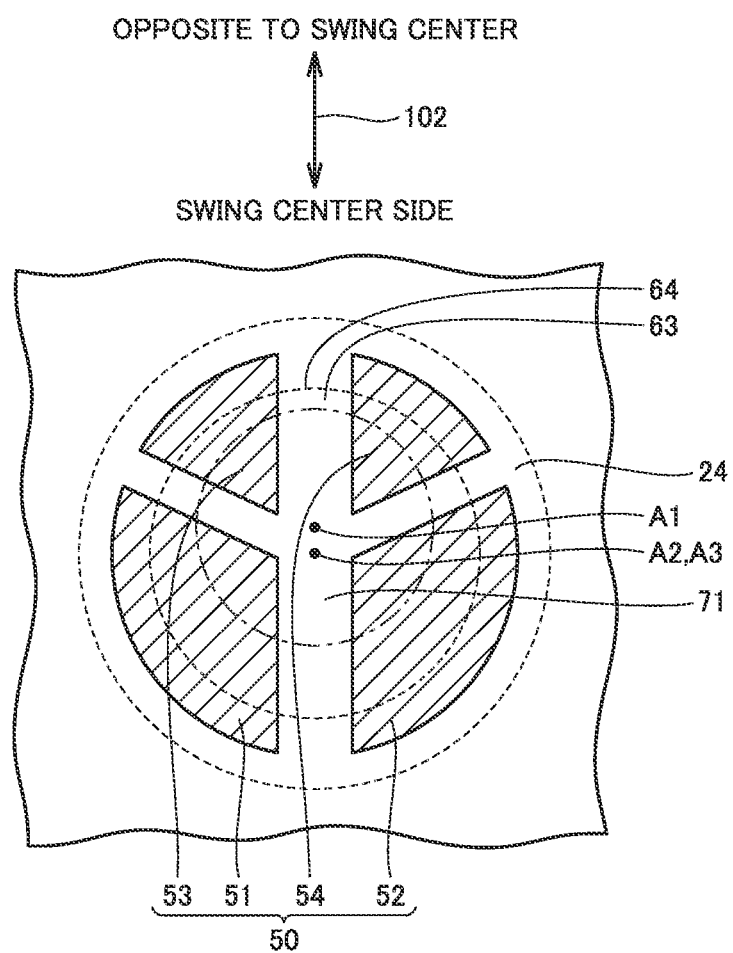
FIG. 15 shows an exemplary illustrative non-limiting schematic plan view illustrating a construction of the contact of the controller according to a third embodiment.

FIG. 15 is a schematic plan view illustrating a construction of contact 50 of controller 100 according to the third embodiment. As shown in FIG. 15, contact 50 may include first contact portion 51, second contact portion 52, a third contact portion 53, and a fourth contact portion 54. When viewed in first direction 101, each of first contact portion 51, second contact portion 52, third contact portion 53, and fourth contact portion 54 may be in a shape of a sector. A central angle of first contact portion 51 may be larger than a central angle of third contact portion 53. A central angle of second contact portion 52 may be larger than a central angle of fourth contact portion 54. First contact portion 51, second contact portion 52, third contact portion 53, and fourth contact portion 54 are distant from one another.

As shown in FIG. 15, in second direction 102 (radial direction), third contact portion 53 may be located on the outer side relative to first contact portion 51. In the radial direction, fourth contact portion 54 may be located on the outer side relative to second contact portion 52. When viewed in first direction 101, the shape of first contact portion 51 and the shape of second contact portion 52 may be in line symmetry to each other. When viewed in first direction 101, the shape of third contact portion 53 and the shape of fourth contact portion 54 may be in line symmetry to each other.

As shown in FIG. 15, when viewed in first direction 101, top surface 71 of pressing member 70 may be arranged to overlap with each of first contact portion 51, second contact portion 52, third contact portion 53, and fourth contact portion 54. Similarly, when viewed in first direction 101, prescribed region 63 of pressed portion 23 may be arranged to overlap with each of first contact portion 51, second contact portion 52, third contact portion 53, and fourth contact portion 54. Controller 100 according to the third embodiment is advantageous similarly to controller 100 according to the first embodiment.

Modification

Figure 16:
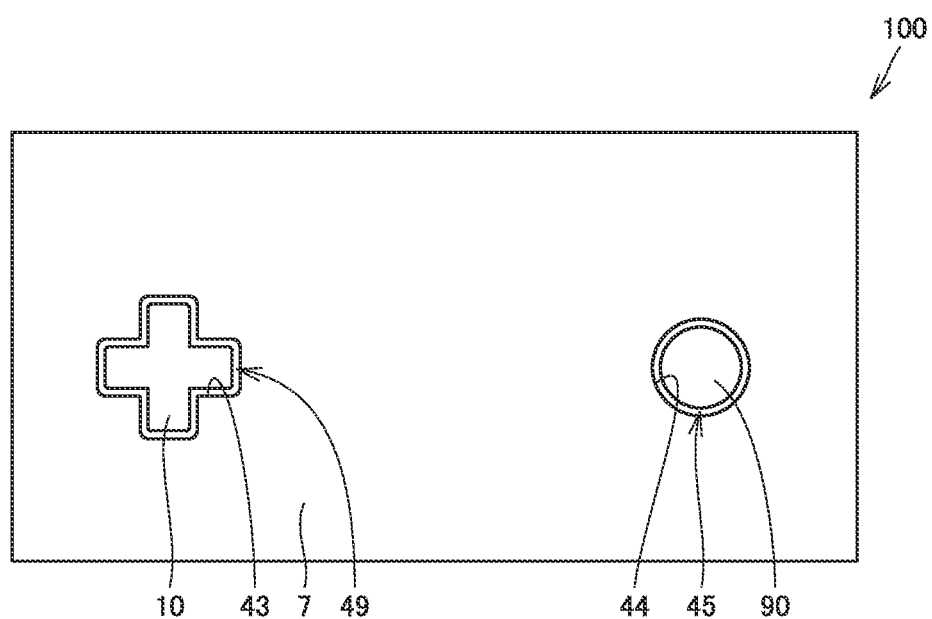
FIG. 16 shows an exemplary illustrative non-limiting schematic plan view illustrating a construction of a modification of the controller.

FIG. 16 is a schematic plan view illustrating a construction of a modification of the controller. As shown in FIG. 16, controller 100 may include an operation button 90. Housing 40 is provided with first through hole 49 and a second through hole 45. Key top 10 is arranged in first through hole 49. Operation button 90 is arranged in second through hole 45. Operation button 90 may be surrounded by a second inner wall surface 44 that defines second through hole 45. When viewed in first direction 101, operation button 90 may be, for example, in a circular shape, although the shape thereof is not particularly limited. When viewed in first direction 101, housing 40 may be, for example, in a rectangular shape, although the shape thereof is not particularly limited.

Controller 100 may further include a storage (not shown) and/or a processor (not shown) and/or a display (not shown). For example, a dynamic random access memory (DRAM) is adopted as the storage. An application program such as a game may be stored in the storage. The processor may read the application program and perform information processing. The display may show, for example, an image generated as a result of information processing performed by the processor. Controller 100 may include the storage, the processor, and the display, and controller 100 alone may function as a game console.

Controller 100 may be controller 100 separate from a game console main body (not shown). Controller 100 may include a communication unit (not shown). Controller 100 may be connected to the game console main body through the communication unit. The communication unit may transmit and receive data over a wireless signal. The communication unit may support such a communication scheme as Bluetooth® or infrared communication. Controller 100 may be controller 100 for operating a game device or controller 100 for operating an information processing apparatus different from a game device.

Key Member

Figure 17:
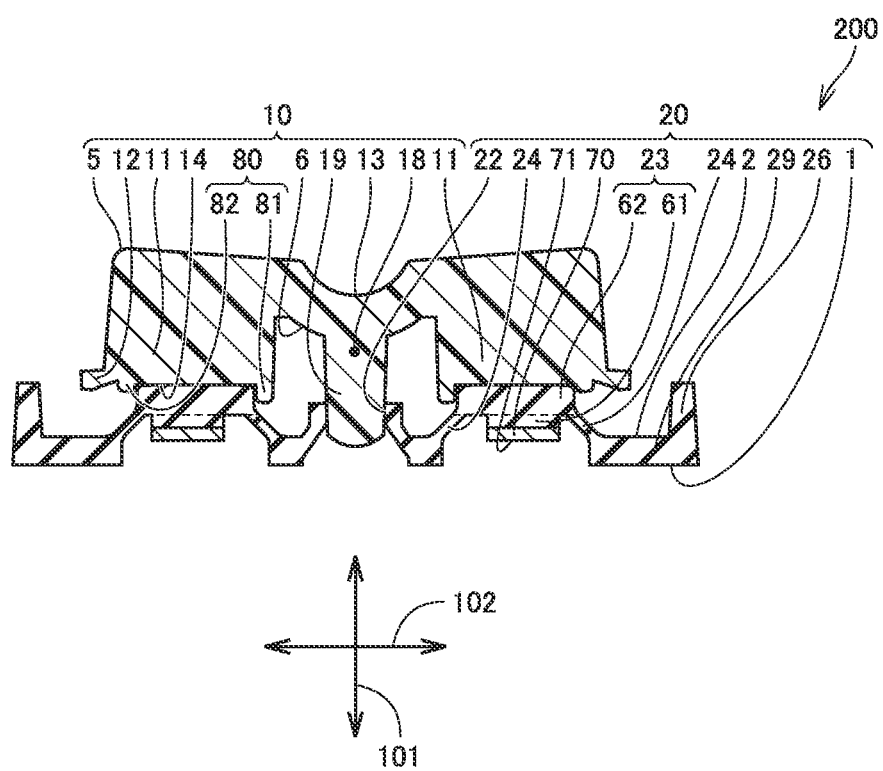
FIG. 17 shows an exemplary illustrative non-limiting schematic vertical cross-sectional view illustrating a construction of a key structure.

FIG. 17 is a schematic vertical cross-sectional view illustrating a construction of a key structure. A key structure 200 includes key top 10 and elastic member 20. The structure of each of key top 10 and elastic member 20 is as described above. In FIG. 17, the same components in key top 10 and elastic member 20 have the same reference numerals allotted and description thereof will not be provided.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A controller comprising:
a substrate;
a key top having a swing center and configured to swing about the swing center when pressed by a user, the key top having a bottom surface that is parallel to the substrate in a non-operated state;
a contact positioned on the substrate; and
an elastic member positioned between the key top and the substrate in a first direction,
the elastic member including:
a base positioned on the substrate,
a pressed portion configured to be pressed by the bottom surface of the key top,
a skirt portion that connects the pressed portion to the base such that the pressed portion is spaced from the base, the skirt portion being elastically deformable when the pressed portion is pressed by the bottom surface of the key top, and
a pressing member positioned in a predetermined region on a side of the pressed portion that faces the substrate, the pressing member being surrounded by the skirt portion, and at least a first surface of the pressing member that faces the substrate being conductive, wherein
the first surface is positioned to contact the contact when the pressing member moves towards the substrate and the skirt portion is elastically deformed,
a second direction is perpendicular to the first direction,
in the non-operated state of the key top, a distance in the second direction between a side of the predetermined region that is proximal to the swing center and a side of the first surface that is proximal to the swing center is longer than a distance between a side of the predetermined region that is distal from the swing center and a side of the first surface that is distal from the swing center, and in the non-operated state of the key top, the contact is located closer, in the second direction, to the swing center than the first surface.

2. The controller according to claim 1, wherein the key top includes a rib that surrounds at least a part of an outer circumferential side surface of the pressed portion.

3. The controller according to claim 2, wherein the rib includes an outer rib portion and an inner rib portion provided closer to the swing center than the outer rib portion, and in the first direction, the inner rib portion is larger in height than the outer rib portion.

4. The controller according to claim 3, wherein in the first direction, the rib increases in height from the outer rib portion toward the inner rib portion.

5. The controller according to claim 3, wherein each of the inner rib portion and the outer rib portion is constructed such that, when the key top is pressed down, a distance between the substrate and the inner rib portion is equal to a distance between the substrate and the outer rib portion.

6. The controller according to claim 2, wherein with a direction being in parallel to the second direction and extending radially from the swing center being defined as a radial direction, when viewed in the first direction, a clearance between the outer circumferential side surface and the rib in a third direction that passes through a center of the rib and is perpendicular to the radial direction is smaller than a clearance between the outer circumferential side surface and the rib in the radial direction that passes through the center of the rib.

7. The controller according to claim 6, wherein the rib includes an inner circumferential surface and a protrusion that protrudes from the inner circumferential surface in the third direction.

8. The controller according to claim 1, wherein when viewed in the first direction, the key top is in a cross shape.

9. The controller according to claim 1, wherein the distance in the second direction between the side of the predetermined region that is proximal to the swing center and the side of the first surface that is proximal to the swing center is longer than the distance between the side of the predetermined region that is distal from the swing center and the side of the first surface that is distal from the swing center, when the skirt portion is in an undeformed state, and the contact is located closer, in the second direction, to the swing center than the first surface, when the skirt portion is in an undeformed state.

10. A key structure comprising:
a key top having a swing center and configured to swing about the swing center when pressed by a user, the key top having a first bottom surface and a second bottom surface that are parallel to one another; and
a first elastic member and a second elastic member positioned adjacent to the key top in a first direction, each of the first elastic member and the second elastic member including:
a base,
a pressed portion configured to be pressed by a corresponding one of the first bottom surface and the second bottom surface of the key top,
a skirt portion that connects the pressed portion to the base such that the pressed portion is spaced from the base, the skirt portion being elastically deformable when the pressed portion is pressed by the corresponding one of the first bottom surface and the second bottom surface of the key top, and
a pressing member positioned in a predetermined region on a side of the pressed portion the pressing member being surrounded by the skirt portion, and at least a first surface of the pressing member being conductive, wherein a second direction is perpendicular to the first direction, in a non-operated state of the key top, a distance in the second direction between a side of the predetermined region that is proximal to the swing center and a side of the first surface that is proximal to the swing center is longer than a distance in the second direction between a side of the predetermined region that is distal from the swing center and a side of the first surface that is distal from the swing center.

11. The key structure according to claim 10, wherein the key top includes a rib that surrounds at least a part of an outer circumferential side surface of the pressed portion.

12. The key structure according to claim 11, wherein the rib includes an outer rib portion and an inner rib portion provided closer to the swing center than the outer rib portion, and in the first direction, the inner rib portion is larger in height than the outer rib portion.

13. The key structure according to claim 12, wherein in the first direction, the rib increases in height from the outer rib portion toward the inner rib portion.

14. The key structure according to claim 11, wherein with a direction being in parallel to the second direction and extending radially from the swing center being defined as a radial direction, when viewed in the first direction, a clearance between the outer circumferential side surface and the rib in a third direction that passes through a center of the rib and is perpendicular to the radial direction is smaller than a clearance between the outer circumferential side surface and the rib in the radial direction that passes through the center of the rib.

15. The key structure according to claim 14, wherein the rib includes an inner circumferential surface and a protrusion that protrudes from the inner circumferential surface in the third direction.

16. The key structure according to claim 10, wherein when viewed in the first direction, the key top is in a cross shape.

17. The key structure according to claim 10, wherein the distance in the second direction between the side of the predetermined region that is proximal to the swing center and the side of the first surface that is proximal to the swing center is longer than the distance in the second direction between the side of the predetermined region that is distal from the swing center and the side of the first surface that is distal from the swing center, when the skirt portion is in an undeformed state.

* * * * *